(12) United States Patent
Kamiyama et al.

(10) Patent No.: US 11,041,468 B2
(45) Date of Patent: Jun. 22, 2021

(54) MIXING CONNECTOR AND ENGINE

(71) Applicant: Komatsu Ltd., Tokyo (JP)

(72) Inventors: Tomohiro Kamiyama, Tokyo (JP); Tomonori Oda, Tokyo (JP); Akihiro Miki, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/649,998

(22) PCT Filed: Aug. 7, 2019

(86) PCT No.: PCT/JP2019/031110
§ 371 (c)(1),
(2) Date: Mar. 24, 2020

(87) PCT Pub. No.: WO2019/230994
PCT Pub. Date: Dec. 5, 2019

(65) Prior Publication Data
US 2021/0040921 A1 Feb. 11, 2021

(51) Int. Cl.
| F02B 47/08 | (2006.01) |
| F02M 26/19 | (2016.01) |
| B01F 3/02 | (2006.01) |
| B01F 5/06 | (2006.01) |
| F02M 35/10 | (2006.01) |

(52) U.S. Cl.
CPC ............ F02M 26/19 (2016.02); B01F 3/026 (2013.01); B01F 5/0647 (2013.01); B01F 5/0651 (2013.01); F02M 35/10222 (2013.01)

(58) Field of Classification Search
CPC ........ F02M 26/00; F02M 26/05; F02M 26/06; F02M 26/07

USPC ..................................................... 123/568.11
See application file for complete search history.

(56) References Cited

U.S. PATENT DOCUMENTS

| 4,327,698 A | 5/1982 | Hamai et al. |
| 6,425,382 B1 | 7/2002 | Marthaler et al. |
| 7,845,340 B2 | 12/2010 | Fuchinoue et al. |
| 8,689,553 B2 | 4/2014 | Johnson et al. |
| 2012/0180478 A1 | 7/2012 | Johnson et al. |

(Continued)

FOREIGN PATENT DOCUMENTS

| CN | 107191295 A | 9/2017 |
| CN | 108150316 A | 6/2018 |

(Continued)

*Primary Examiner* — John Kwon
(74) *Attorney, Agent, or Firm* — Locke Lord LLP

(57) ABSTRACT

A mixing connector includes an intake passage, an EGR passage that fetches a portion of exhaust gas exhausted from an engine body to use as EGR gas, and that returns the EGR gas to the intake passage, and a merging section that connects the EGR passage to the intake passage so that longitudinal directions of the intake passage and the EGR passage intersect each other. An upstream side region located on an inlet port side of the intake passage from the merging section on an opposite wall surface configuring an inner surface of the intake passage and located on a side opposite to the merging section includes a first wall surface and a second wall surface which are sequentially arranged at an interval from the merging section side toward the inlet port, and a third wall surface projecting inward of the first wall surface between the first and second wall surfaces.

20 Claims, 7 Drawing Sheets

(56) References Cited

U.S. PATENT DOCUMENTS

| | | | | |
|---|---|---|---|---|
| 2012/0224955 A1* | 9/2012 | Vine | ............... | F04D 17/122 |
| | | | | 415/208.1 |
| 2016/0207805 A1* | 7/2016 | Jang | ............... | C02F 3/1278 |
| 2018/0080362 A1* | 3/2018 | Kasai | ............... | F01N 3/2892 |
| 2019/0032929 A1* | 1/2019 | Maeyama | ............ | F25B 41/00 |
| 2019/0195174 A1 | 6/2019 | Asai | | |

FOREIGN PATENT DOCUMENTS

| | | |
|---|---|---|
| DE | 102013223053 A1 | 5/2015 |
| EP | 1270918 A1 | 1/2003 |
| EP | 2960481 A1 | 12/2015 |
| JP | 02-119970 U | 9/1990 |
| JP | 2000-073877 A | 3/2000 |
| JP | 2010-144669 A | 7/2010 |
| JP | 4853480 B2 | 1/2012 |
| JP | 5530267 B2 | 6/2014 |
| JP | 5578367 B2 | 8/2014 |
| JP | 2017-203421 A | 11/2017 |
| JP | 2018-188983 A | 11/2018 |
| WO | 2010/123905 A1 | 10/2010 |
| WO | 2016/140898 A1 | 9/2016 |

\* cited by examiner

MIXING CONNECTOR AND ENGINE

TECHNICAL FIELD

The present invention relates to a mixing connector and an engine.

BACKGROUND ART

Patent Documents 1 to 3 disclose an engine as follows. In order to reduce NOx contained in exhaust gas exhausted from an engine body, part of the exhaust gas exhausted from the engine body is mixed with external air (fresh air) to be used as exhaust gas recirculation (EGR) gas. The EGR gas returns to the engine body. In the engine disclosed in Patent Documents 1 to 3, a heater for heating the external air is disposed on an upstream side from a merging section of the EGR gas in an intake passage which introduces the external air into the engine body.

CITATION LIST

Patent Literature

[Patent Document 1] United States Patent Application, Publication No. 2012/0180478
[Patent Document 2] Japanese Unexamined Patent Application, First Publication No. 2018-188983
[Patent Document 3] Japanese Unexamined Patent Application, First Publication No. 2010-144669

DISCLOSURE OF INVENTION

Technical Problem

However, according to this type of the engine, in some cases, the EGR gas may reversely flow to the upstream side of the intake passage from the merging section. In this case, soot contained in the EGR gas adheres to the heater, thereby causing a problem in that performance of the heater may be degraded.

A reverse flow of the EGR gas in the intake passage is generated as follows. When the engine is operated, all intake valves of the engine body are instantaneously or temporarily closed, and a flow of the external air flowing from the intake passage toward the engine body is temporary stopped.

The present invention is made in view of the problems, and an object thereof is to provide a mixing connector and an engine which can suppress performance degradation of a heater by preventing EGR gas from reaching the heater.

Solution to Problem

According to a first aspect of the present invention, there is provided a mixing connector including an intake passage for introducing external air into an engine body, an EGR passage that fetches a part of exhaust gas exhausted from the engine body to use as EGR gas, and that returns the EGR gas to the intake passage, and a merging section that connects the EGR passage to an intermediate portion of the intake passage in a longitudinal direction so that longitudinal directions of the intake passage and the EGR passage intersect each other. An upstream side region located on an inlet port side of the intake passage from the merging section on an opposite wall surface configuring an inner surface of the intake passage and located on a side opposite to the merging section in a direction perpendicular to the longitudinal direction of the intake passage includes a first wall surface and a second wall surface which are sequentially arranged at an interval from the merging section side toward the inlet port in the longitudinal direction of the intake passage, and a third wall surface which projects inward of the first wall surface between the first wall surface and the second wall surface.

According to a second aspect of the present invention, there is provided a mixing connector including an intake passage for introducing external air into an engine body, an EGR passage that fetches a part of exhaust gas exhausted from the engine body to use as EGR gas, and that returns the EGR gas to the intake passage, and a merging section that connects the EGR passage to an intermediate portion of the intake passage in a longitudinal direction so that longitudinal directions of the intake passage and the EGR passage intersect each other. The intake passage has an upstream side passage including an inlet port of the intake passage, a downstream side passage located on a downstream end side of the upstream side passage and extending in a direction different from a direction of the upstream side passage, and a bent passage connecting the upstream side passage and the downstream side passage to each other. The merging section is located at least in an upstream end portion of the downstream side passage located on the bent passage side. The mixing connector includes a projection portion that projects from an inner region corresponding to an inside of the bent passage in a radial direction on an inner surface of the downstream side passage, and that faces the merging section between the merging section and a facing region, the facing region facing the merging section and being located on a side opposite to the merging section in a direction perpendicular to the longitudinal direction of the intake passage. A gap is formed between a tip of the projection portion in a projecting direction and an outer region facing the inner region on the inner surface of the downstream side passage.

According to the first aspect of the present invention, there is provided an engine including the mixing connector and an engine body.

Advantageous Effects of Invention

According to the present invention, it is possible to suppress performance degradation of a heater disposed in an inlet port of an intake passage by preventing EGR gas from reaching the heater.

BEST MODE FOR CARRYING OUT THE INVENTION

Hereinafter, an embodiment according to the present invention will be described in detail with reference to FIGS. 1 to 8. A mixing connector 100 according to the present embodiment includes an engine 1 shown in FIG. 1. The engine 1 will be first described.

<Engine>

Figure 1:
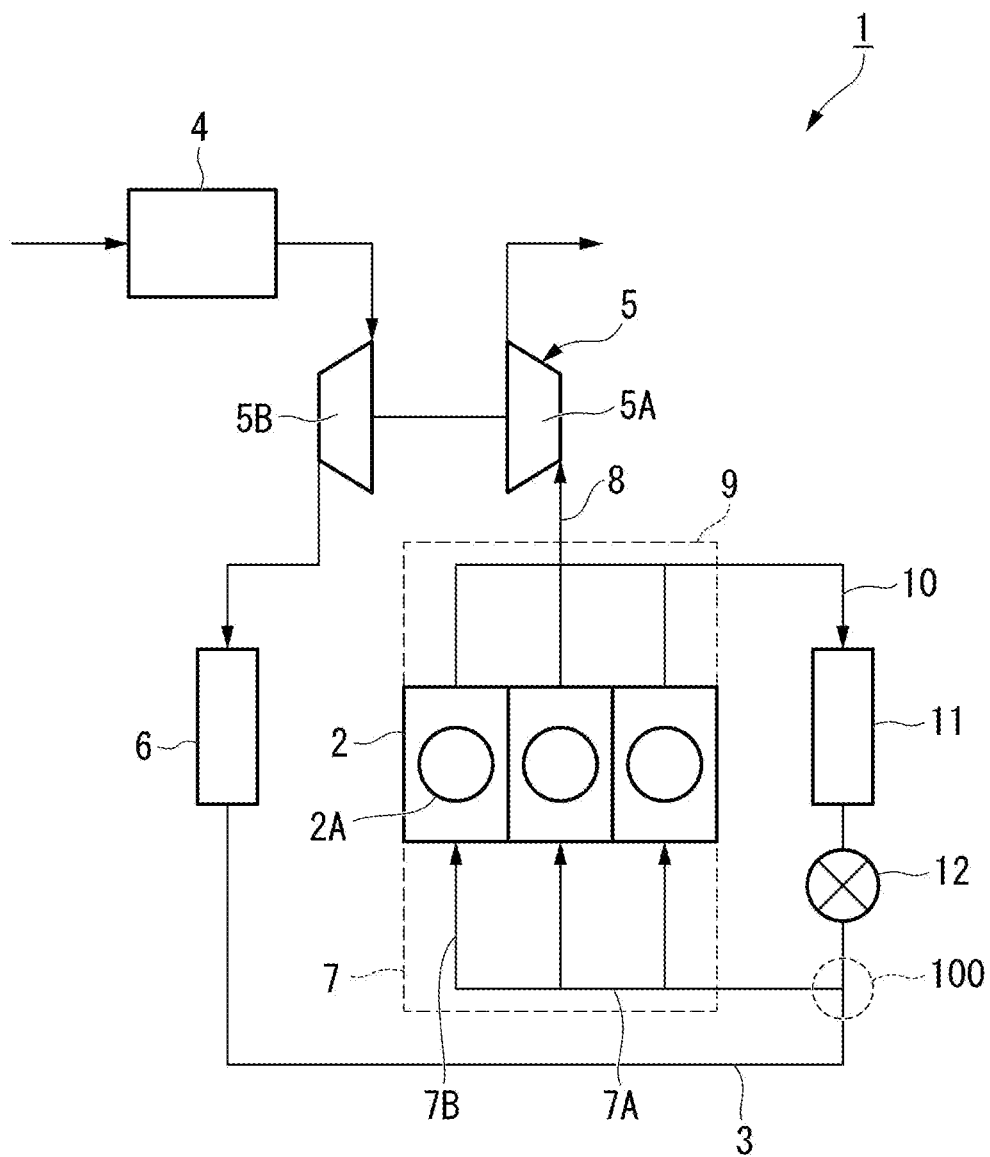
FIG. 1 is schematic view illustrating an engine according to an embodiment of the present invention.

As shown in FIG. 1, the engine 1 includes an engine body 2 internally having a plurality of combustion chambers 2A in addition to a mixing connector 100 (to be described later). The engine body 2 shown in FIG. 1 is a three-cylinder engine having three combustion chambers 2A.

In addition, the engine 1 further includes an intake route 3, an air cleaner 4, an exhaust turbocharger 5 having a turbine 5A and a compressor 5B, an after-cooler 6, and an intake manifold 7. The intake route 3 is a route for introducing external air into the engine body 2. The air cleaner 4, the compressor 5B of the exhaust turbocharger 5, and the after-cooler 6 are aligned with one another in this order in a direction toward the engine body 2 in the intake route 3.

The exhaust turbocharger 5 uses exhaust gas exhausted from the engine body 2 so as to compress the external air suctioned through the air cleaner 4. The turbine 5A of the exhaust turbocharger 5 is rotated using exhaust energy of the exhaust gas. The compressor 5B of the exhaust turbocharger 5 is rotated together with the turbine 5A, and compresses the external air. The after-cooler 6 cools air (external air) compressed and heated by the exhaust turbocharger 5.

The intake manifold 7 is disposed between the engine body 2 and the intake route 3, and distributes the air flowing from the intake route 3 (external air) to the respective combustion chambers 2A. The intake manifold 7 according to the present embodiment has a main stream section 7A which extends in an arrangement direction of the combustion chambers 2A and through which the air from the intake route 3 flows, and a plurality of (three in the illustrated example) branch sections 7B which extend from the main stream section 7A to the respective combustion chambers 2A. The plurality of branch sections 7B are respectively connected to the main stream section 7A at positions away from each other at an interval in an extending direction of the main stream section 7A. Therefore, in the intake manifold 7 according to the present embodiment, lengths of a plurality of routes from an entrance to the respective combustion chambers 2A are different from each other. In the intake manifold 7, for example, the above-described lengths of the plurality of routes may be equal to each other.

The engine 1 further includes an exhaust route 8, an exhaust manifold 9, an EGR route 10, an EGR cooler 11, and an EGR valve 12. The exhaust route 8 is a route for exhausting the exhaust gas from the engine body 2. The above-described turbine 5A of the exhaust turbocharger 5 is located in an intermediate portion of the exhaust route 8. The exhaust manifold 9 is disposed between the engine body 2 and the exhaust route 8, and collects the exhaust gas exhausted from the respective combustion chambers 2A of the engine body 2 so that the exhaust gas flows into the exhaust route 8.

The EGR route 10 extends from the exhaust manifold 9 to an area of the intake route 3 between the after-cooler 6 and the intake manifold 7. For example, the EGR route 10 may extend from the exhaust route 8 to the intake route 3. The EGR route 10 is a route for fetching part of the exhaust gas exhausted from the engine body 2 to use as EGR gas, and returning the EGR gas to the intake route 3. The EGR cooler 11 and the EGR valve 12 are aligned with each other in this order in a direction toward the intake route 3 in the EGR route 10.

The EGR cooler 11 cools the EGR gas. The EGR valve 12 opens and closes the EGR route 10. The EGR valve 12 opens the EGR route 10 in a case where pressure of the EGR gas (exhaust gas) in the EGR route 10 is higher than pressure of the external air passing through the intake route 3. In this manner, the EGR gas can return to the intake route 3. The EGR valve 12 is controlled to be opened and closed by an engine controller (not shown) in accordance with a detection signal output from NOx amount detecting means (not shown) disposed in the exhaust route 8 or the exhaust manifold 9.

<Mixing Connector>

The mixing connector 100 configures a section where the intake route 3 and the EGR route 10 merge with each other. Hereinafter, the mixing connector 100 will be described.

Figure 2:
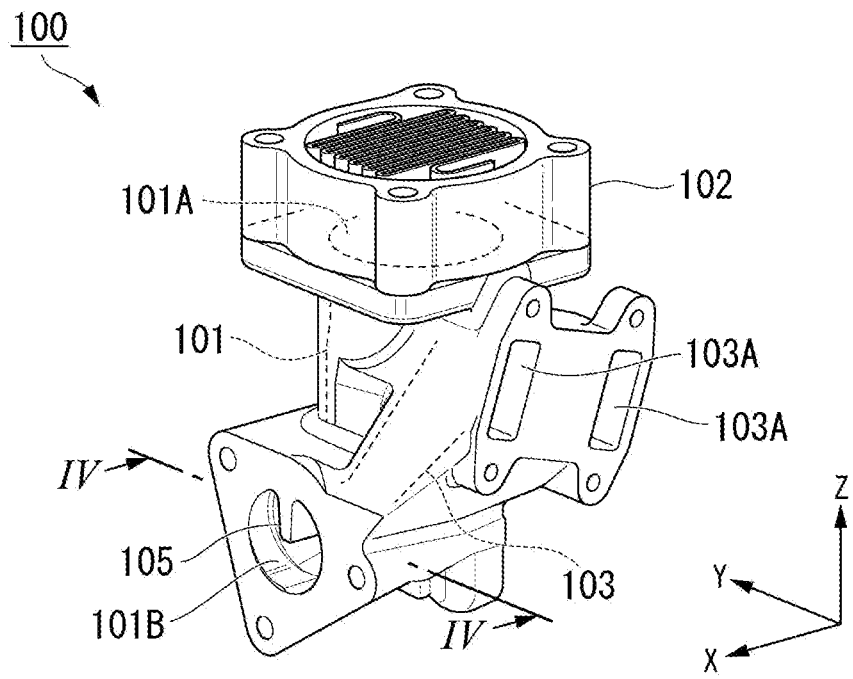
FIG. 2 is a perspective view illustrating an external appearance of a mixing connector according to the embodiment of the present invention.
Figure 3:
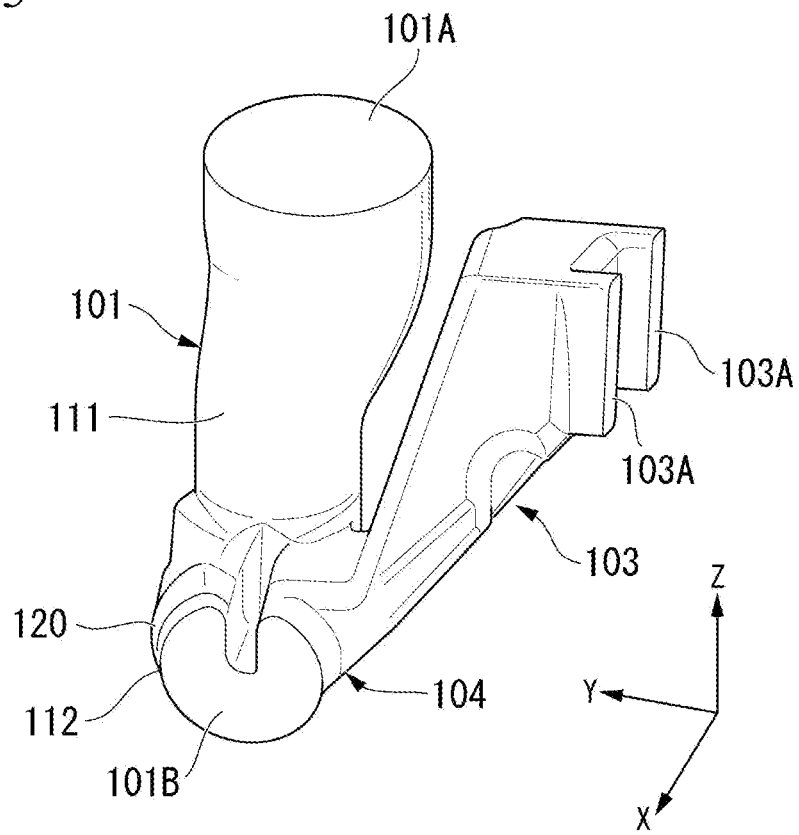
FIG. 3 is a perspective view illustrating an intake passage and an EGR passage inside the mixing connector in FIG. 2.

The mixing connector 100 according to the present embodiment is a casting. As shown in FIGS. 2 and 3, the mixing connector 100 includes an intake passage 101, a heater 102, an EGR passage 103, and a merging section 104. FIG. 3 shows an internal passage of the mixing connector 100 including the intake passage 101 and the EGR passage 103.

The intake passage 101 is a passage for introducing the external air into the engine body 2, and has an inlet port 101A and an outlet port 101B. The inlet port 101A of the intake passage 101 is connected to a downstream side of the after-cooler 6 in the intake route 3 shown in FIG. 1. The outlet port 101B of the intake passage 101 is connected to the engine body 2 side shown in FIG. 1. In this manner, the external air from the after-cooler 6 flows toward the engine body 2 through the intake passage 101 of the mixing connector 100. The intake passage 101 may be located in an intermediate portion of the intake route 3, for example, or may be located between the intake route 3 and the intake manifold 7, for example.

Figure 5:
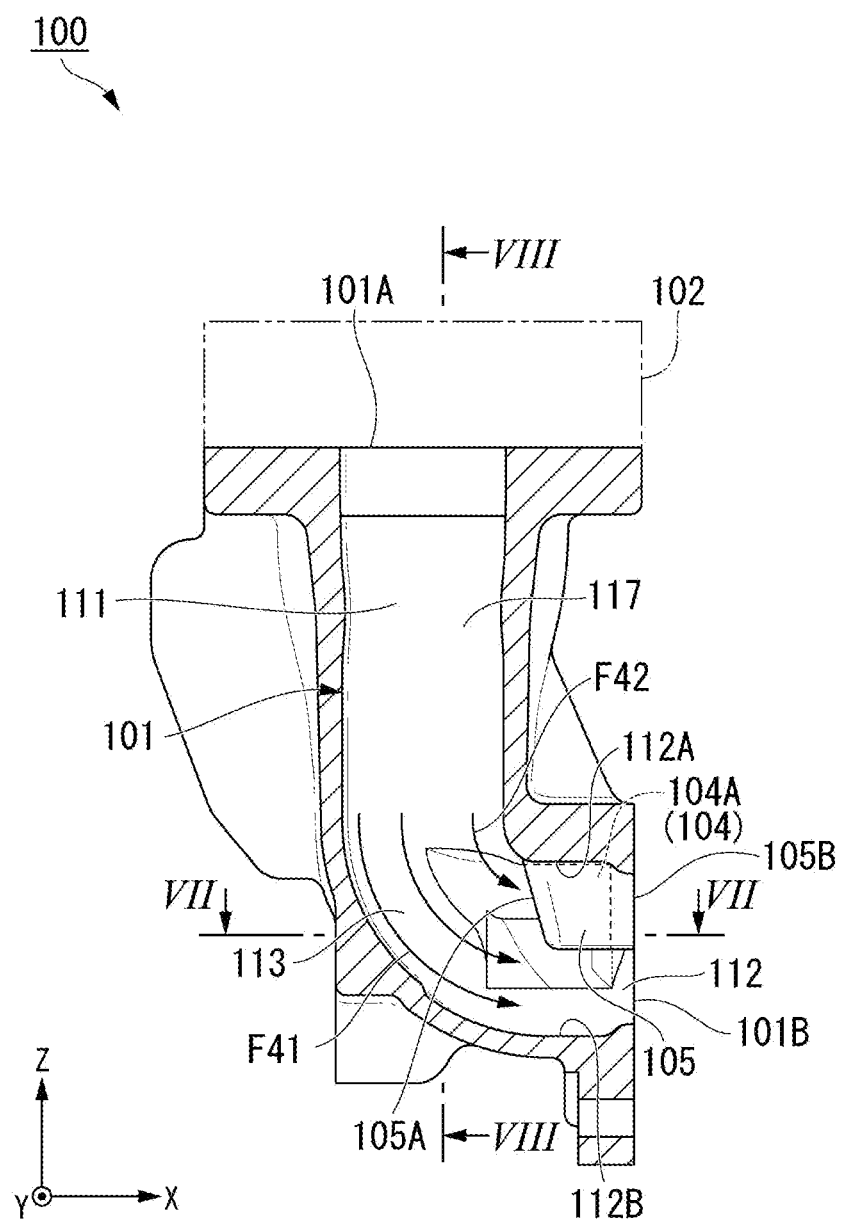
FIG. 5 is a sectional view taken along line V-V in FIG. 4.
Figure 6:
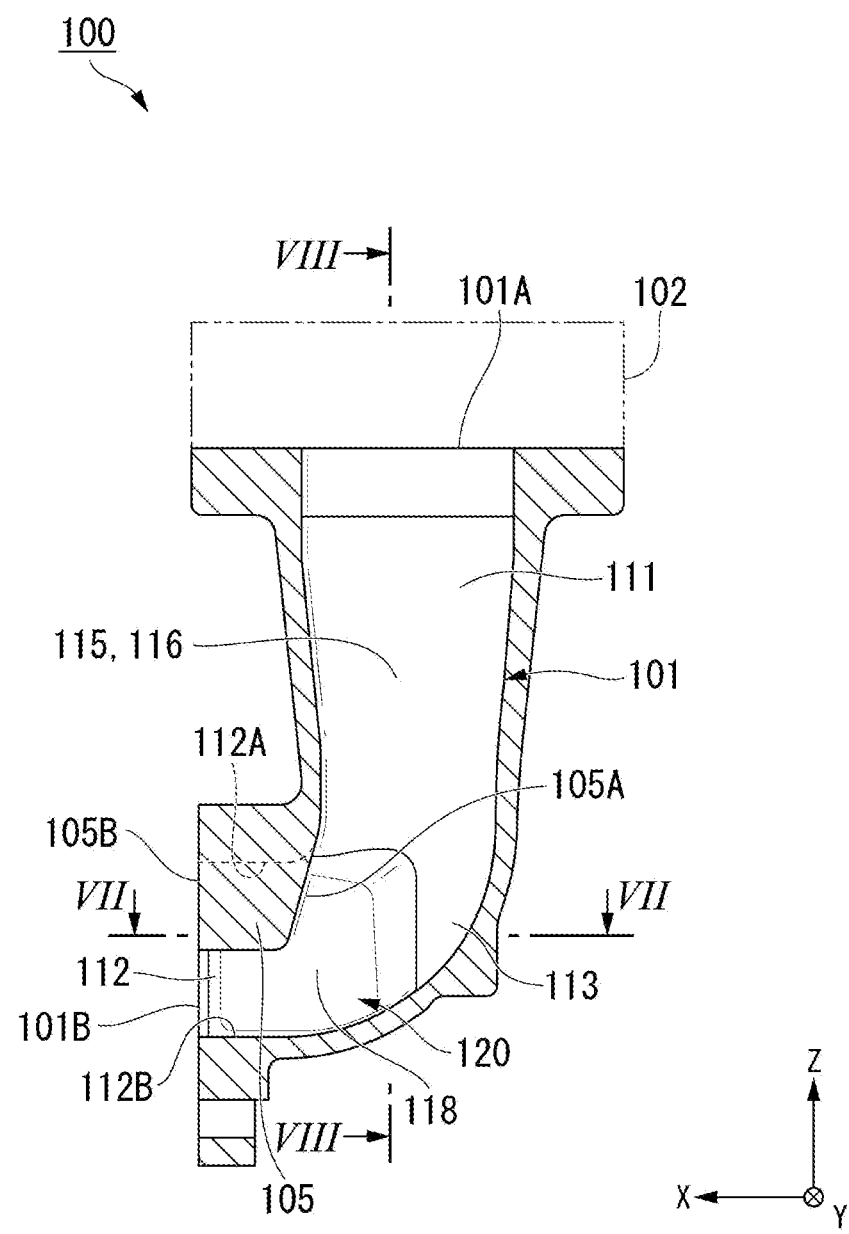
FIG. 6 is a sectional view taken along line VI-VI in FIG. 4.

The intake passage 101 may be formed in a linear shape, for example. As shown in FIGS. 5 and 6, the intake passage 101 according to the present embodiment is bent in an intermediate portion of the intake passage 101 in the longitudinal direction. Specifically, the intake passage 101 has an upstream side passage 111, a downstream side passage 112 extending in a direction different from a direction of the upstream side passage 111, and a bent passage 113 connecting the upstream side passage 111 and the downstream side passage 112 to each other.

The upstream side passage 111 includes the inlet port 101A of the intake passage 101. The downstream side passage 112 is located on the downstream end side of the upstream side passage 111, and includes the outlet port 101B of the intake passage 101. The length of the downstream side passage 112 in the illustrated example is shorter than the length of the upstream side passage 111. However, the present invention is not limited thereto. The upstream side passage 111 and the downstream side passage 112 respectively extend in a linear shape. The upstream side passage 111 and the downstream side passage 112 may intersect each other at any desired angle. In the present embodiment, both of these are perpendicular to each other. In the illustrated example, the upstream side passage 111 extends in a Z-axis direction, and the downstream side passage 112 extends in an X-axis direction which is perpendicular to the Z-axis direction. The bent passage 113 may be at least a passage which is bent. The bent passage 113 according to the present embodiment is curved to smoothly connect the upstream side passage 111 and the downstream side passage 112 to each other.

The intake passage 101 according to the present embodiment is formed in a tapered shape whose flow path cross section decreases from the inlet port 101A toward the outlet port 101B. In particular, the upstream side passage 111 is formed in a tapered shape.

The heater 102 is disposed in the inlet port 101A of the intake passage 101. The heater 102 warms the external air in a case where the temperature of the external air is low, for example. In this manner, it is possible to suppress or prevent a possibility that the external air having an excessively low temperature may be introduced into the combustion chamber 2A (refer to FIG. 1) of the engine body 2.

Figure 4:
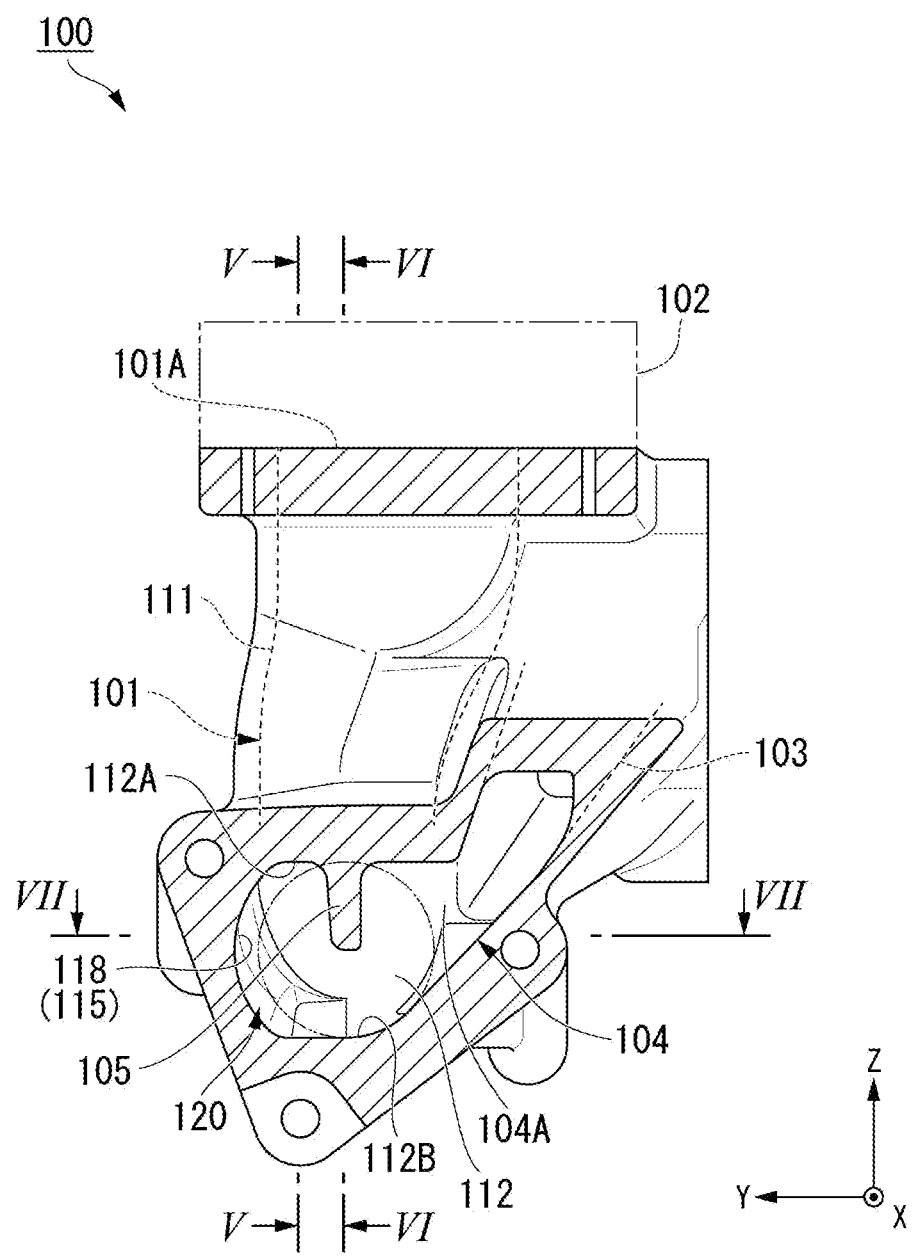
FIG. 4 is a sectional view taken along line IV-IV in FIG. 2.
Figure 8:
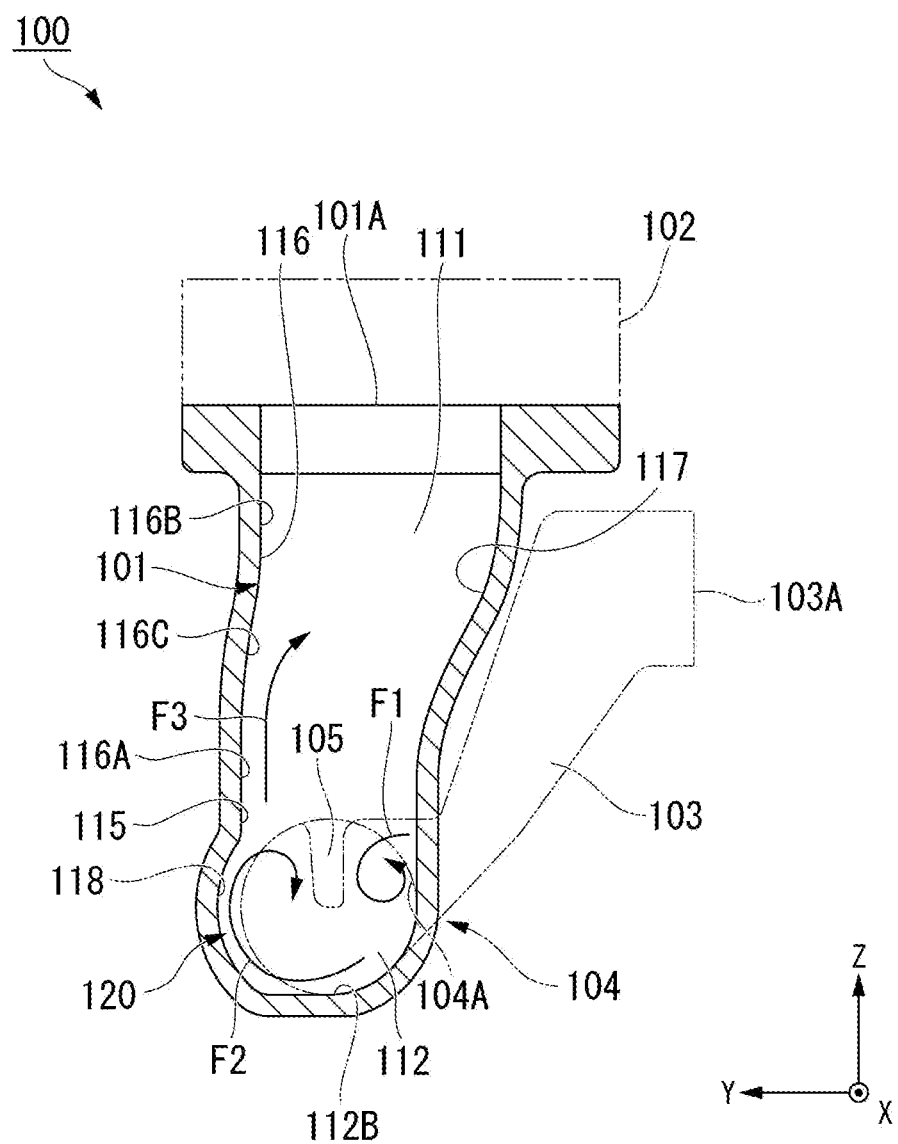
FIG. 8 is a sectional view taken along line VIII-VIII in FIGS. 5 to 7.

As shown in FIGS. 3, 4, and 8, the EGR passage 103 is a passage for fetching part of the exhaust gas exhausted from the engine body 2 to use as the EGR gas and returning the EGR gas to the intake passage 101. In the present embodiment, the EGR passage 103 configures a downstream side end portion of the above-described EGR route 10 (refer to FIG. 1). A plurality of (two in the illustrated example) the inlet ports 103A of the EGR passage 103 connected to the EGR route 10 may be provided as shown in FIGS. 2 and 3. However, for example, one inlet port 103A may be provided. The EGR passage 103 shown in FIG. 3 is formed in the tapered shape whose flow path cross section decreases from the inlet port 103A toward the intake passage 101 side. However, the present invention is not limited thereto.

As shown in FIGS. 3, 4, and 8, in the merging section 104, the EGR passage 103 is connected to the intermediate portion of the intake passage 101 in the longitudinal direction so that the longitudinal directions of the intake passage 101 and the EGR passage 103 intersect each other. The merging section 104 according to the present embodiment connects the EGR passage 103 to the intermediate portion of the intake passage 101 so that the longitudinal directions of the intake passage 101 and the EGR passage 103 are perpendicular to each other. The merging section 104 includes a downstream end of the EGR passage 103 which is open on the inner surface of the intake passage 101. The downstream end of the EGR passage 103 is an inflow port 104A of the EGR gas supplied to the intake passage 101. In the following description, the downstream end of the EGR passage 103 may be referred to as the inflow port 104A of the merging section 104, in some cases.

Figure 7:
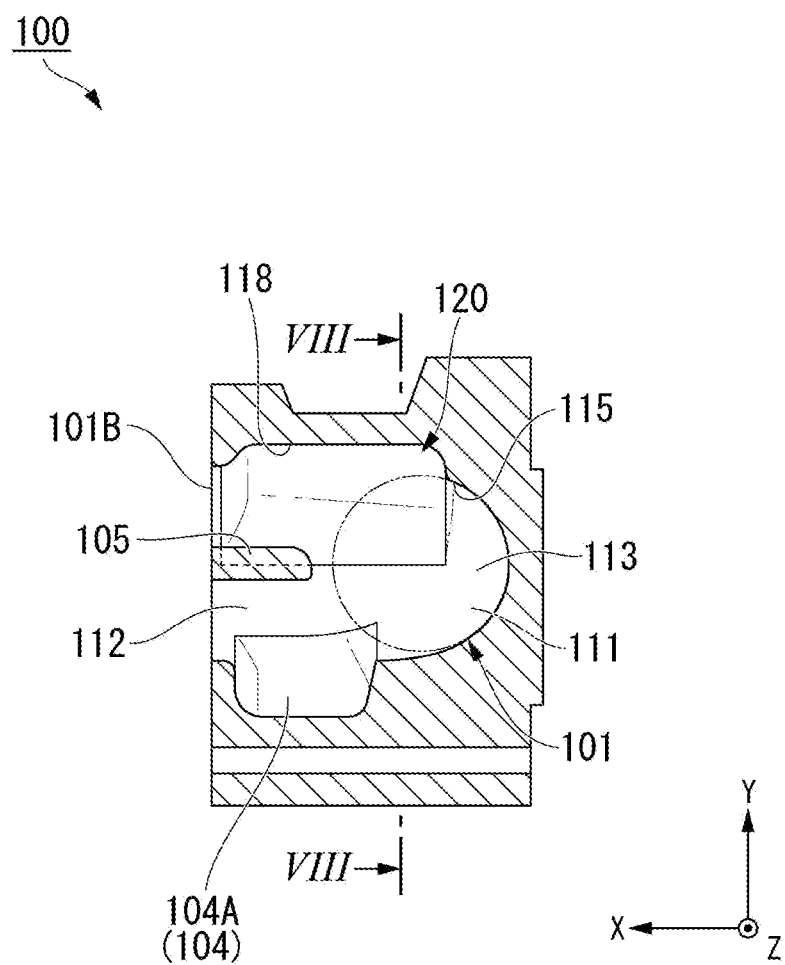
FIG. 7 is a sectional view taken along line VII-VII in FIGS. 4 to 6.

As shown in FIGS. 5 and 7, the merging section 104 (particularly, the inflow port 104A) is located in an upstream end portion of the downstream side passage 112 located on the bent passage 113 side in the longitudinal direction of the downstream side passage 112. In addition, according to the present embodiment, a portion of the merging section 104 (particularly, the inflow port 104A) is also located in a downstream end portion of the bent passage 113 located on the upstream end side of the downstream side passage 112. When viewed in a direction shown in FIG. 5 (Y-axis direction), the merging section 104 is located on a rear side of a projection portion 105 (to be described later).

In addition, as shown in FIGS. 4 and 5, the inflow port 104A of the merging section 104 according to the present embodiment is open in a region between an inner region 112A of the downstream side passage 112 corresponding to the inside of the bent passage 113 in the radial direction and an outer region 112B of the downstream side passage 112 corresponding to the outside of the bent passage 113 in the radial direction, in the circumferential direction of the inner surface of the downstream side passage 112, on the inner surface of the downstream side passage 112. In this manner, a direction in which the EGR gas flows into the intake passage 101 from the EGR passage 103 is a direction (Y-axis direction in FIG. 5) that is substantially perpendicular to the longitudinal direction (X-axis direction in FIG. 5) of the downstream side passage 112 and the radial direction (Z-axis direction in FIG. 5) of the bent passage 113 in the downstream end of the bent passage 113.

As shown in FIG. 8, the inner surface of the intake passage 101 includes an upstream side region 116 located on the inlet port 101A side of the intake passage 101 from the merging section 104, on an opposite wall surface 115 configuring the inner surface and located on a side opposite to the merging section 104 (particularly, the inflow port 104A) in the direction (Z-axis direction in FIG. 8) perpendicular to the longitudinal direction of the intake passage 101. The upstream side region 116 according to the present embodiment configures the inner surface of the upstream side passage 111 of the intake passage 101.

The upstream side region 116 includes a first wall surface 116A, a second wall surface 116B, and a third wall surface 116C. The first wall surface 116A and the second wall surface 116B are located at an interval in this order from the merging section 104 side toward the inlet port 101A in the longitudinal direction of the intake passage 101. The third wall surface 116C projects inward of the first wall surface 116A (inward in the radial direction of the intake passage 101) between the first wall surface 116A and the second wall surface 116B.

In the present embodiment, the third wall surface 116C is an inclined surface inclined to extend toward the inlet port 101A in the longitudinal direction of the intake passage 101, as the third wall surface 116C extends inward of the first wall surface 116A from an end on the inlet port 101A side of the first wall surface 116A. Then, the first wall surface 116A and the third wall surface 116C are continuous with each other on a curved surface. Similarly, the second wall surface 116B and the third wall surface 116C are continuous with each other on a curved surface. That is, the first wall surface 116A and the third wall surface 116C are smoothly connected to each other, and the second wall surface 116B and the third wall surface 116C are smoothly connected to each other.

In addition, according to the present embodiment, the second wall surface 116B is located inside the first wall surface 116A. The first wall surface 116A and the second wall surface 116B may be located to be parallel to each other in the longitudinal direction of the intake passage 101 as in the illustrated example. However, the present invention is not limited thereto. Furthermore, an upstream facing region 117 facing the first to third wall surfaces 116A to 116C in the radial direction of the intake passage 101 on the inner surface of the intake passage 101 is curved so that an interval from the second wall surface 116B is larger than an interval from the first wall surface 116A. In this manner, the intake passage 101 (particularly, the upstream side passage 111) can be formed in a tapered shape.

As shown in FIGS. 4 to 6, the mixing connector 100 according to the present embodiment further includes the projection portion 105. The projection portion 105 projects in a negative Z-axis direction from the inner region 112A toward the outer region 112B of the downstream side passage 112. As shown in FIG. 7, the projection portion 105 is located between the merging section 104 (inflow port 104A) and a facing region 118 facing the merging section 104 (inflow port 104A) on the opposite wall surface 115 of the intake passage 101, and faces the merging section 104

(inflow port 104A). The projection portion 105 is located at an interval from both the facing region 118 and the inflow port 104A of the merging section 104 in the Y-axis direction.

As shown in FIGS. 4 to 6, a gap is formed between a tip of the projection portion 105 in a projecting direction and the outer region 112B of the downstream side passage 112. That is, the tip of the projection portion 105 does not reach the outer region 112B of the downstream side passage 112. The projecting length of the projection portion 105 according to the present embodiment is approximately half of the length from the inner region 112A to the outer region 112B. However, the present invention is not limited thereto.

For example, the projection portion 105 may face the whole inflow port 104A of the merging section 104 when viewed in a direction (Y-axis direction) in which the projection portion 105 and the inflow port 104A of the merging section 104 are aligned with each other as shown in FIG. 5. However, according to the present embodiment, the projection portion 105 faces a portion of the inflow port 104A of the merging section 104. Specifically, the projection portion 105 faces a portion of the inflow port 104A which is close to the inner region 112A of the downstream side passage 112, and does not face a portion close to the outer region 112B of the downstream side passage 112. In this manner, a flow of the EGR gas flowing from the EGR passage 103 to the portion close to the inner region 112A in the downstream side passage 112 is blocked by the projection portion 105. On the other hand, a flow of the EGR gas flowing from the EGR passage 103 to the portion close to the outer region 112B in the downstream side passage 112 is not blocked by the projection portion 105, and reaches the facing region 118 (refer to FIG. 4).

As shown in FIGS. 5 and 6, an end portion 105A located on the upstream side of the intake passage 101 in the projection portion 105 is inclined from the upstream side passage 111 toward the downstream side passage 112 (that is, toward the outlet port 101B of the intake passage 101), as the end portion is directed to the tip from the base end of the projection portion 105 in the projecting direction. An upstream side end portion 105A of the projection portion 105 may be located in an upstream end of the downstream side passage 112 as in the illustrated example. Alternatively, for example, the upstream side end portion 105A may be located on the downstream side at an interval from the upstream end of the downstream side passage 112. On the other hand, a downstream side end portion 105B of the projection portion 105 may be located in the outlet port 101B of the intake passage 101 as in the illustrated example. Alternatively, the downstream side end portion 105B may be located on the upstream side of the downstream side passage 112 at an interval from the outlet port 101B of the intake passage 101.

The projection portion 105 may be formed in any desired shape. The projection portion 105 according to the present embodiment is formed in a plate shape in which an alignment direction (Y-axis direction in FIGS. 4 and 8) of the projection portion 105 and the inflow port 104A of the merging section 104 is set to a plate thickness direction as shown in FIGS. 4 and 8.

As shown in FIGS. 4 and 6 to 8, a recessed portion 120 recessed from the opposite wall surface 115 is formed in the facing region 118 of the opposite wall surface 115 of the intake passage 101. According to the present embodiment, the recessed portion 120 is formed in the upstream end portion of the downstream side passage 112 in the facing region 118. In addition, the recessed portion 120 according to the present embodiment is formed to extend to the downstream end portion of the bent passage 113 (particularly refer to FIGS. 6 and 7). The inner surface of the recessed portion 120 may be formed in any desired shape. However, according to the present embodiment, as shown in FIG. 8, the inner surface is formed in a smoothly curved arc shape in a cross section perpendicular to the longitudinal direction (X-axis direction) of the downstream side passage 112.

<Operational Effect>

In the mixing connector 100 according to the present embodiment configured as described above, as shown in FIG. 8, the EGR gas flowing from the EGR passage 103 into the intake passage 101 mainly flows from the inflow port 104A of the merging section 104 toward the facing region 118 of the opposite wall surface 115 which faces the inflow port 104A. A flow of the EGR gas flowing into the intake passage 101 is partially blocked by the projection portion 105. That is, the EGR gas flowing into the intake passage 101 is partially weakened by the projection portion 105. In this manner, it is possible to suppress a reverse flow of the EGR gas from the merging section 104 toward the inlet port 101A of the intake passage 101. An arrow F1 in FIG. 8 shows an example of the flow of the EGR gas which is blocked by the projection portion 105.

In addition, a partial flow of the EGR gas flowing from the EGR passage 103 into the intake passage 101 passes through the gap between the tip of the projection portion 105 and the outer region 112B of the downstream side passage 112, and reaches the facing region 118 which faces the inflow port 104A of the merging section 104. Here, the recessed portion 120 is formed in the facing region 118. Accordingly, the EGR gas partially flows into the recessed portion 120. Therefore, the EGR gas can be caused to stay in the recessed portion 120. In this manner, it is possible to suppress the reverse flow of the EGR gas from the merging section 104 toward the inlet port 101A of the intake passage 101. An arrow F2 in FIG. 8 shows an example of the flow of the EGR gas staying in the recessed portion 120.

Part of the EGR gas reaching the facing region 118 of the opposite wall surface 115 may flow toward the inlet port 101A of the intake passage 101 along the first wall surface 116A of the opposite wall surface 115 located on the upstream side of the facing region 118, in some cases. In this case, a flowing direction of the EGR gas flowing along the first wall surface 116A is changed by the third wall surface 116C projecting inward of the first wall surface 116A. Specifically, due to the third wall surface 116C, flowing components of the EGR gas flowing toward the inlet port 101A decrease, and flowing components of the EGR gas flowing inward in the radial direction of the upstream side inner surface. That is, the flow of the EGR gas flowing toward the inlet port 101A is weakened by the third wall surface 116C. In this manner, it is possible to reduce a possibility that the EGR gas may reach the inlet port 101A and the heater 102 of the intake passage 101. An arrow F3 in FIG. 8 shows an example of the EGR gas which is weakened by the third wall surface 116C.

In addition, in the mixing connector 100 according to the present embodiment, as shown in FIG. 5, the external air flows sequentially from the inlet port 101A of the intake passage 101 to the outlet port 101B through the upstream side passage 111, the bent passage 113, and the downstream side passage 112. Therefore, in the bent passage 113, a flow velocity of a flow F41 of the external air flowing outward in the radial direction is faster than a flow velocity of a flow F42 of the external air flowing inward in the radial direction. In addition, the projection portion 105 is located in a region corresponding to the inside of the bent passage 113 in the radial direction in the downstream side passage 112, and is not located in a region corresponding to the outside of the bent passage 113 in the radial direction. Therefore, the flow F41 of the external air which is fast outside the bent passage 113 in the radial direction reaches the outlet port 101B of the intake passage 101 without being blocked by the projection portion 105 and without reducing the flow velocity.

On the other hand, the projection portion 105 blocks the flow of the EGR gas flowing into the intake passage 101 in a region (that is, a region where the flow velocity of the external air is slow) corresponding to the inside of the bent passage 113 in the radial direction in the downstream side passage 112 (particularly, refer to the arrow F1 in FIG. 8). Therefore, the flow velocity of the EGR gas flowing into the intake passage 101 can be effectively reduced. In this manner, the flow F41 of the external air which is fast outside the bent passage 113 in the radial direction is not disturbed or is less likely to be disturbed by the flow of the EGR gas flowing into the intake passage 101. In a region corresponding to the inside of the bent passage 113 in the radial direction where the flow velocity of the external air is slow, the EGR gas whose flow velocity is reduced by the projection portion 105 is satisfactorily mixed with the external air whose flow velocity is slow.

The EGR gas whose flow velocity is reduced by the projection portion 105 rides on the flow F41 of the external air which is fast outside the bent passage 113 in the radial direction. In this manner, the EGR gas flows from the outlet port 101B of the intake passage 101 toward the engine body 2 at a fast flow velocity together with the external air.

As described above, according to the mixing connector 100 and the engine 1 of the present embodiment, the first wall surface 116A, the third wall surface 116C, and the second wall surface 116B are aligned with one another sequentially from the merging section 104 side toward the inlet port 101A in the upstream side region 116 of the opposite wall surface 115 of the intake passage 101 located on the side opposite to the merging section 104. Then, the third wall surface 116C projects inward of the first wall surface 116A. Therefore, even if the EGR gas flowing into the intake passage 101 in the merging section 104 reversely flows toward the inlet port 101A along the first wall surface 116A, the flowing direction of the EGR gas can be changed by the third wall surface 116C. In this manner, it is possible to suppress a possibility that the EGR gas may reach the inlet port 101A of the intake passage 101. Therefore, soot contained in the EGR gas can be prevented from adhering to the heater 102 disposed in the inlet port 101A, and it is possible to suppress performance degradation of the heater 102.

In addition, according to the mixing connector 100 of the present embodiment, the third wall surface 116C is the inclined surface. The first wall surface 116A and the third wall surface 116C are smoothly continuous with each other on the curved surface, and the second wall surface 116B and the third wall surface 116C are smoothly continuous with each other on the curved surface. Therefore, based on the first to third wall surfaces 116A to 116C, it is possible to suppress the occurrence of pressure loss in the external air flowing in the intake passage 101 (particularly, the upstream side passage 111).

In addition, according to the mixing connector 100 of the present embodiment, the projection portion 105 disposed on the inner surface of the downstream side passage 112 is disposed to weaken the flow of the EGR gas flowing into the intake passage 101 from the inflow port 104A of the merging section 104. In addition, the projection portion 105 is disposed so as not to inhibit the flow F41 of the external air which is fast outside the bent passage 113 in the radial direction. Therefore, the external air can flow from the outlet port 101B of the intake passage 101 toward the engine body 2 at a fast flow velocity. In addition, the EGR gas whose flow velocity is reduced by the projection portion 105 rides on the flow F41 of the external air which is fast outside the bent passage 113 in the radial direction, and can flow from the outlet port 101B of intake passage 101 toward the engine body 2 at the fast flow velocity together with the external air. In this manner, the EGR gas having a large specific gravity can be reliably supplied to the combustion chamber 2A of the engine body 2 by causing the EGR gas to ride on the fast flow of the external air. In addition, as in the intake manifold 7 according to the present embodiment, even if the lengths of the plurality of routes from the entrance to the respective combustion chambers 2A are different from each other, the EGR gas can be equally supplied to all of the combustion chambers 2A by causing the EGR gas to ride on the fast flow of the external air. That is, mixed gas having an equal concentration of the EGR gas can be supplied to all of the combustion chambers 2A of the engine body 2.

In addition, according to the mixing connector 100 of the present embodiment, the upstream side end portion 105A of the projection portion 105 is inclined from the upstream side passage 111 toward the downstream side passage 112 as the upstream side end portion 105A is directed to the tip from the base end of the projection portion 105 in the projecting direction. Therefore, due to the projection portion 105, it is possible to reduce the pressure loss of the external air flowing in the intake passage 101 (particularly, the external air flowing inward in the radial direction of the bent passage 113). That is, it is possible to suppress a possibility that the flow of the external air in the intake passage 101 may be weakened by the projection portion 105.

In addition, according to the mixing connector 100 of the present embodiment, the recessed portion 120 is formed in the facing region 118 facing the merging section 104 on the inner surface of the intake passage 101. In this manner, the EGR gas flowing into the intake passage 101 from the inflow port 104A of the merging section 104 can stay in the recessed portion 120. In this manner, the reverse flow of the EGR gas from the merging section 104 toward the inlet port 101A of the intake passage 101 is suppressed. Accordingly, the soot contained in the EGR gas can be more effectively prevented from adhering to the heater 102 disposed in the inlet port 101A.

The reverse flow of the EGR gas from the merging section 104 toward the inlet port 101A of the intake passage 101 is likely to occur in the engine 1 having three combustion chambers 2A (number of cylinders) as in the present embodiment. Therefore, the mixing connector 100 according to the present embodiment which can suppress the reverse flow of the EGR gas is particularly effectively applicable to the three-cylinder engine as in the present embodiment.

OTHER EMBODIMENTS

Hitherto, the embodiment according to the present invention has been described. However, the present invention is not limited thereto, and can be appropriately modified within the scope not departing from the technical idea of the present invention.

In the mixing connector according to the present invention, in a case where the second wall surface 116B is located inside the first wall surface 116A, the third wall surface 116C located between the first wall surface 116A and the second wall surface 116B may be a stepped surface connecting the first wall surface 116A and the second wall surface 116B to each other in a step shape, for example. That is, the third wall surface 116C may be perpendicular to the first wall surface 116A. In addition, the third wall surface 116C located between the first wall surface 116A and the second wall surface 116B may be configured to include a projection projecting inward of the first wall surface 116A and the second wall surface 116B, for example. In this case, the second wall surface 116B may be located inside the first wall surface 116A as in the above-described embodiment. However, the present invention is not limited thereto.

In the mixing connector according to the present invention, the projection portion 105 may project toward the inner region 112A from the outer region 112B of the downstream side passage 112, for example. Even in this case, the flow of the EGR gas flowing into the intake passage 101 from the EGR passage 103 can be weakened by the projection portion 105 (flow velocity can be reduced). Therefore, it is possible to suppress a possibility that the EGR gas may reach the heater 102.

In the mixing connector according to the present invention, for example, the inflow port 104A of the merging section 104 may be open in the outer region 112B or the inner region 112A on the inner surface of the downstream side passage 112.

In the mixing connector according to the present invention, for example, in the merging section 104, the EGR passage 103 may be connected to the intermediate portion of the intake passage 101 so as to extend in the longitudinal direction of the intake passage 101 as the EGR passage 103 is away from the intake passage 101 in the radial direction of the intake passage 101. In this case, the direction in which the EGR gas flows into the intake passage 101 from the EGR passage 103 may include a component in a direction toward the downstream side of the intake passage 101. In this manner, it is possible to suppress the reverse flow of the EGR gas flowing to the upstream side of the intake passage 101 compared to the merging section 104.

The engine according to the present invention may be applied to any desired work vehicle such as a dump truck, a hydraulic excavator, a bulldozer, a motor grader, and a crane.

REFERENCE SIGNS LIST

1: engine
2: engine body
3: intake route
7: intake manifold
8: exhaust route
9: exhaust manifold
10: EGR route
100: mixing connector
101: intake passage
101A: inlet port
101B: outlet port
102: heater
103: EGR passage
104: merging section
105: projection portion
105A: upstream side end portion of projection portion 105
111: upstream side passage
112: downstream side passage
112A: inner region
112B: outer region
113: bent passage
115: opposite wall surface
116: upstream side region
116A: first wall surface
116B: second wall surface
116C: third wall surface
118: facing region
120: recessed portion

DRAWINGS

FIG. 1
FIG. 2
FIG. 3
FIG. 4
FIG. 5
FIG. 6
FIG. 7
FIG. 8

The invention claimed is:

1. A mixing connector comprising:
an intake passage for introducing external air into an engine body;
an EGR passage that fetches a part of exhaust gas exhausted from the engine body to use as EGR gas, and that returns the EGR gas to the intake passage; and
a merging section that connects the EGR passage to an intermediate portion of the intake passage in a longitudinal direction so that longitudinal directions of the intake passage and the EGR passage intersect each other,
wherein an upstream side region located on an inlet port side of the intake passage from the merging section on an opposite wall surface configuring an inner surface of the intake passage and located on a side opposite to the merging section in a direction perpendicular to the longitudinal direction of the intake passage includes a first wall surface and a second wall surface which are sequentially arranged at an interval from the merging section side toward the inlet port in the longitudinal direction of the intake passage, and a third wall surface which projects inward of the first wall surface between the first wall surface and the second wall surface.

2. The mixing connector according to claim 1,
wherein the third wall surface is an inclined surface inclined to extend toward the inlet port as the inclined surface extends inward of the first wall surface from an end of the first wall surface on the inlet port side, and
wherein the first wall surface and the third wall surface are continuous with each other on a curved surface, and the second wall surface and the third wall surface are continuous with each other on a curved surface.

3. The mixing connector according to claim 1,
wherein the intake passage has an upstream side passage including the inlet port, a downstream side passage located on a downstream end side of the upstream side passage and extending in a direction different from a direction of the upstream side passage, and a bent passage connecting the upstream side passage and the downstream side passage to each other,
wherein the merging section is located at least in an upstream end portion of the downstream side passage located on the bent passage side,
wherein the mixing connector includes a projection portion that projects from an inner region corresponding to an inside of the bent passage in a radial direction on an inner surface of the downstream side passage, and that is located between the merging section and a facing region facing the merging section on the opposite wall surface so as to face the merging section, and wherein a gap is formed between a tip of the projection portion in a projecting direction and an outer region facing the inner region on the inner surface of the downstream side passage.

4. The mixing connector according to claim 3, wherein an upstream side end portion of the projection portion is inclined from the upstream side passage toward the downstream side passage as the upstream side end portion is directed from a base end to a tip of the projection portion in the projecting direction.

5. The mixing connector according to claim 1, wherein a recessed portion recessed from an opposite wall surface is formed in a facing region of the opposite wall surface of the intake passage, the recessed portion formed in the upstream end portion of the downstream side passage.

6. A mixing connector comprising:

an intake passage for introducing external air into an engine body;

an EGR passage that fetches a part of exhaust gas exhausted from the engine body to use as EGR gas, and that returns the EGR gas to the intake passage; and a merging section that connects the EGR passage to an intermediate portion of the intake passage in a longitudinal direction so that longitudinal directions of the intake passage and the EGR passage intersect each other, wherein the intake passage has an upstream side passage including an inlet port of the intake passage, a downstream side passage located on a downstream end side of the upstream side passage and extending in a direction different from a direction of the upstream side passage, and a bent passage connecting the upstream side passage and the downstream side passage to each other, wherein the merging section is located at least in an upstream end portion of the downstream side passage located on the bent passage side, wherein the mixing connector includes a projection portion that projects from an inner region corresponding to an inside of the bent passage in a radial direction on an inner surface of the downstream side passage, and that faces the merging section by being located between the merging section and a facing region, the facing region facing the merging section and being located on a side opposite to the merging section in a direction perpendicular to the longitudinal direction of the intake passage, and wherein a gap is formed between a tip of the projection portion in a projecting direction and an outer region facing the inner region on the inner surface of the downstream side passage.

7. An engine comprising:
the mixing connector according to claim 1; and
an engine body.

8. The mixing connector according to claim 2, wherein the intake passage has an upstream side passage including the inlet port, a downstream side passage located on a downstream end side of the upstream side passage and extending in a direction different from a direction of the upstream side passage, and a bent passage connecting the upstream side passage and the downstream side passage to each other, wherein the merging section is located at least in an upstream end portion of the downstream side passage located on the bent passage side, wherein the mixing connector includes a projection portion that projects from an inner region corresponding to an inside of the bent passage in a radial direction on an inner surface of the downstream side passage, and that is located between the merging section and a facing region facing the merging section on the opposite wall surface so as to face the merging section, and wherein a gap is formed between a tip of the projection portion in a projecting direction and an outer region facing the inner region on the inner surface of the downstream side passage.

9. The mixing connector according to claim 8, wherein an upstream side end portion of the projection portion is inclined from the upstream side passage toward the downstream side passage as the upstream side end portion is directed from a base end to a tip of the projection portion in the projecting direction.

10. The mixing connector according to claim 2, wherein a recessed portion recessed from an opposite wall surface is formed in a facing region of the opposite wall surface of the intake passage, the recessed portion formed in the upstream end portion of the downstream side passage.

11. The mixing connector according to claim 3, wherein a recessed portion recessed from an opposite wall surface is formed in a facing region of the opposite wall surface of the intake passage, the recessed portion formed in the upstream end portion of the downstream side passage.

12. The mixing connector according to claim 4, wherein a recessed portion recessed from an opposite wall surface is formed in a facing region of the opposite wall surface of the intake passage, the recessed portion formed in the upstream end portion of the downstream side passage.

13. The mixing connector according to claim 8, wherein a recessed portion recessed from an opposite wall surface is formed in a facing region of the opposite wall surface of the intake passage, the recessed portion formed in the upstream end portion of the downstream side passage.

14. The mixing connector according to claim 9, wherein a recessed portion recessed from an opposite wall surface is formed in a facing region of the opposite wall surface of the intake passage, the recessed portion formed in the upstream end portion of the downstream side passage.

15. An engine comprising:
the mixing connector according to claim 2; and
an engine body.

16. An engine comprising:
the mixing connector according to claim 3; and
an engine body.

17. An engine comprising:
the mixing connector according to claim 4; and
an engine body.

18. An engine comprising:
the mixing connector according to claim 5; and
an engine body.

19. An engine comprising:
the mixing connector according to claim 6; and
an engine body.

20. An engine comprising:
the mixing connector according to claim 8; and
an engine body.

* * * * *